United States Patent
Li

(10) Patent No.: US 10,268,538 B2
(45) Date of Patent: Apr. 23, 2019

(54) EFFICIENT AND ENHANCED DISTRIBUTED STORAGE CLUSTERS

(71) Applicant: Alibaba Group Holding Limited, George Town (KY)

(72) Inventor: Shu Li, Bothell, WA (US)

(73) Assignee: Alibaba Group Holding Limited (KY)

( * ) Notice: Subject to any disclaimer, the term of this patent is extended or adjusted under 35 U.S.C. 154(b) by 109 days.

(21) Appl. No.: 15/362,555

(22) Filed: Nov. 28, 2016

(65) Prior Publication Data

US 2018/0150351 A1    May 31, 2018

(51) Int. Cl.
| | |
|---|---|
| G06F 11/10 | (2006.01) |
| G06F 3/06 | (2006.01) |
| G06F 12/0804 | (2016.01) |
| G06F 12/0806 | (2016.01) |

(52) U.S. Cl.
CPC .......... *G06F 11/1008* (2013.01); *G06F 3/061* (2013.01); *G06F 3/065* (2013.01); *G06F 3/067* (2013.01); *G06F 3/0647* (2013.01); *G06F 12/0804* (2013.01); *G06F 12/0806* (2013.01); *G06F 2212/60* (2013.01)

(58) Field of Classification Search
CPC .... G06F 11/1008; G06F 3/061; G06F 3/0647; G06F 3/065; G06F 3/067; G06F 12/0804; G06F 2212/60; G06F 12/0806
USPC ................................ 714/773, 770, 768, 763
See application file for complete search history.

(56) References Cited

U.S. PATENT DOCUMENTS

| | | | |
|---|---|---|---|
| 5,179,561 A | 1/1993 | Izawa | |
| 5,870,413 A * | 2/1999 | Kodama | H03M 13/09 714/758 |
| 6,480,125 B2 | 11/2002 | Rub | |
| 7,042,949 B1 * | 5/2006 | Omura | G01S 5/021 375/240.22 |
| 8,108,502 B2 | 1/2012 | Tabbara | |
| 8,386,425 B1 * | 2/2013 | Kadayam | H04L 67/1095 707/613 |
| 8,667,360 B2 * | 3/2014 | Motwani | H03M 13/1102 714/752 |
| 8,799,746 B2 | 8/2014 | Baker | |
| 8,924,816 B2 * | 12/2014 | Khan | G06F 3/0608 348/14.13 |
| 8,934,333 B2 * | 1/2015 | Kim | H04L 1/1819 370/216 |

(Continued)

Primary Examiner — John J Tabone, Jr.
(74) Attorney, Agent, or Firm — Van Pelt, Yi & James LLP

(57) ABSTRACT

Storing data is described herein, including: receiving a first data, wherein the first data comprises a portion of a data block; encoding at least a portion of the first data to generate a codeword; dividing the codeword into a plurality of codeword portions; storing a first codeword portion; and sending at least a subset of codeword portions other than the first codeword portion among the plurality of the codeword portions to a plurality of nodes. Receiving acknowledgement of storage of data is also described herein, including: determining whether a first acknowledgement from a first node is received, wherein the first data comprises a portion of a data block; determining whether a second acknowledgement from the first node is received; and in response to receipt of the first acknowledgement and receipt of the second acknowledgment, determining that the first data has been stored.

16 Claims, 9 Drawing Sheets

(56) References Cited

U.S. PATENT DOCUMENTS

| | | | |
|---|---|---|---|
| 8,984,365 B1* | 3/2015 | Norrie | H03M 13/1111 |
| | | | 714/755 |
| 9,281,844 B2* | 3/2016 | Anholt | H03M 13/15 |
| 9,372,870 B1* | 6/2016 | Levy | G06F 17/30206 |
| 9,524,210 B1* | 12/2016 | Asnaashari | G06F 11/1044 |
| 2003/0201932 A1* | 10/2003 | Rabinowitz | G01S 5/0036 |
| | | | 342/357.29 |
| 2005/0168358 A1* | 8/2005 | Kuznetsov | G11B 20/1426 |
| | | | 341/59 |
| 2010/0235711 A1* | 9/2010 | Kim | G06F 11/10 |
| | | | 714/755 |
| 2011/0252289 A1* | 10/2011 | Patapoutian | G06F 11/1048 |
| | | | 714/763 |
| 2011/0320915 A1* | 12/2011 | Khan | G06F 3/0608 |
| | | | 714/773 |
| 2013/0135988 A1* | 5/2013 | Kim | H04L 1/1819 |
| | | | 370/216 |
| 2014/0122973 A1* | 5/2014 | Motwani | G06F 11/1048 |
| | | | 714/773 |
| 2016/0110252 A1* | 4/2016 | Hyun | G11C 29/52 |
| | | | 714/766 |
| 2016/0182091 A1* | 6/2016 | Stewart | H03M 13/2906 |
| | | | 714/755 |
| 2016/0357633 A1* | 12/2016 | Wilson | G06F 11/1076 |
| 2017/0090776 A1* | 3/2017 | Kowles | G06F 3/0608 |
| 2017/0185328 A1* | 6/2017 | Li | G06F 3/0619 |
| 2017/0272100 A1* | 9/2017 | Yanovsky | G06F 3/0619 |
| 2017/0272209 A1* | 9/2017 | Yanovsky | G06F 3/0619 |

\* cited by examiner

US 10,268,538 B2

EFFICIENT AND ENHANCED DISTRIBUTED STORAGE CLUSTERS

BACKGROUND OF THE INVENTION

Some traditional systems of storing data on a cluster of storages at a data center include various drawbacks. A first example drawback is that typically, a large amount of data is transferred through the Ethernet fabric and imposes a heavy burden on the network infrastructure. A second example drawback is that presently, a storage server processor, such as a central processing unit (CPU), is needed to handle the erasure coding and decoding, which is computationally burdensome on the CPU. A third drawback is that because typically, a copy of the same data block needs to be separately written at each of multiple storages in the cluster, each storage's data cache, which may include flash storage, can be degraded over time due to the extensive writing of data. To withstand the frequent writing of data blocks, higher performance flash storage may be used, which further increases cost. A fourth drawback is that it takes a non-trivial amount of time to write a copy of the same data block at each of various storages in the cluster.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
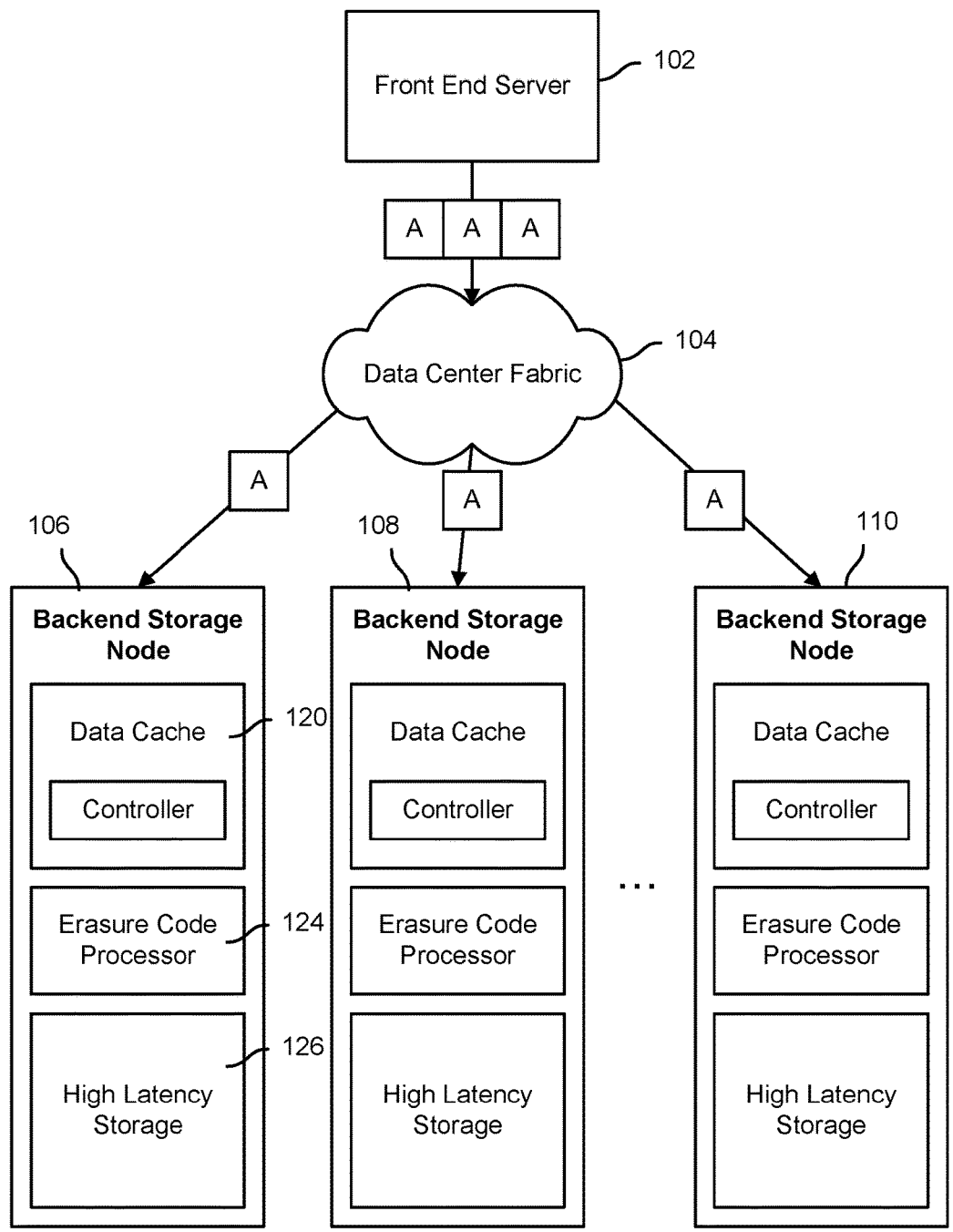
FIG. 1 is a diagram showing a conventional distributed storage cluster.

FIG. 1 is a diagram showing a conventional distributed storage cluster. Backend storage nodes 106, 108, and 110 are a subset of backend storage nodes that belong in a cluster of backend storage nodes that redundantly store at least some of the data that is received from front end server 102 over data center fabric 104. Front end server 102 is configured to send at least three copies of data block A over data center fabric 104 such that a copy of data block A is received at each of backend storage nodes 106, 108, and 110 and any other backend storage nodes that are part of the same cluster but not shown in the diagram to store their respective copies of data block A. Backend storage nodes 106, 108, and 110 each include at least some of the same components, including a data cache, a data cache controller, an erasure code processor, and a high latency storage. For purposes of illustration, only the storage of data block A that is received by backend storage node 106 will be described even though a similar storage technique may be used by backend storage nodes 108 and 110 and other backend storage nodes of the cluster. The copy of data block A that is received at backend storage node 106 is stored (e.g., without further processing) at data cache 120, which comprises a low latency storage. For example, a low latency storage comprises a solid state drive (SSD) storage (e.g., NAND). For example, the copy of data block A, which is written to data cache 120 is in a log-structure format. Then, erasure code processor 124 is configured to generate a codeword based on the copy of data block A that is read out from data cache 120 and a selected erasure code. For example, erasure code processor 124 comprises a central processing unit (CPU). The codeword that is generated by erasure code processor 124 is then written to high latency storage 126 as a stable destination for data holding. For example, high latency storage 126 may be a hard disk drive (e.g., HDD).

The conventional distributed storage cluster includes several shortcomings. First, as many copies of a data block as there are backend storage nodes need to be sent from front end server 102 across data center fabric 104 (e.g., if there were M number of backend storage nodes, then M copies of a data block are to be sent across data center fabric 104), which consumes a fair share of the network bandwidth of data center fabric 104. Secondly, as many copies of a data block as there are backend storage nodes need to be written to the data caches of the respective backend storage nodes, which causes a significant amount of data to be written to write sensitive SSD storage and therefore leads to a suboptimal usage of the SSD storage. Third, using software running on a CPU to implement an erasure code processor is not as efficient as if the same erasure coding were performed by hardware by another type of processor. Fourth, if high latency storage 126 is not a physical component of backend storage node 106, then further network bandwidth of data center fabric 104 needs to be consumed to send the codewords generated by erasure code processor 124 to high latency storage 126.

Embodiments of efficient and enhanced distributed storage clusters are described herein. In various embodiments, a front end server sends portions of data blocks to each backend storage node of a cluster of backend storage nodes. In various embodiments, a portion of a data block is sometimes referred to as a "data chunk." The backend storage node is configured to use a controller associated with its data cache to encode the received data chunk using a selected erasure code to generate a codeword. The backend storage's data cache controller is further configured to divide the codeword into multiple portions. In various embodiments, one portion of the codeword is stored at the data cache and the remaining portions of the codeword are distributed to and to be stored at other backend storage nodes of the cluster. In some embodiments, groups of portions of different codewords that are stored at the data cache are copied into a local high latency storage of the backend storage node.

In various embodiments, two levels of acknowledgements with respect to a data chunk that is sent by the front end server are to be received at the front end server. In response to receiving the two levels of acknowledgements, the front end server will determine that the data chunk has been successfully stored at the cluster of backend storage nodes. In some embodiments, a first acknowledgement is an acknowledgement indicating that a sent data chunk has been successfully received at a backend storage node and a second acknowledgement is an acknowledgement indicating that the portions of a divided codeword (that is generated based on the sent data chunk) have been successfully received at corresponding other backend storage nodes.

Figure 2:
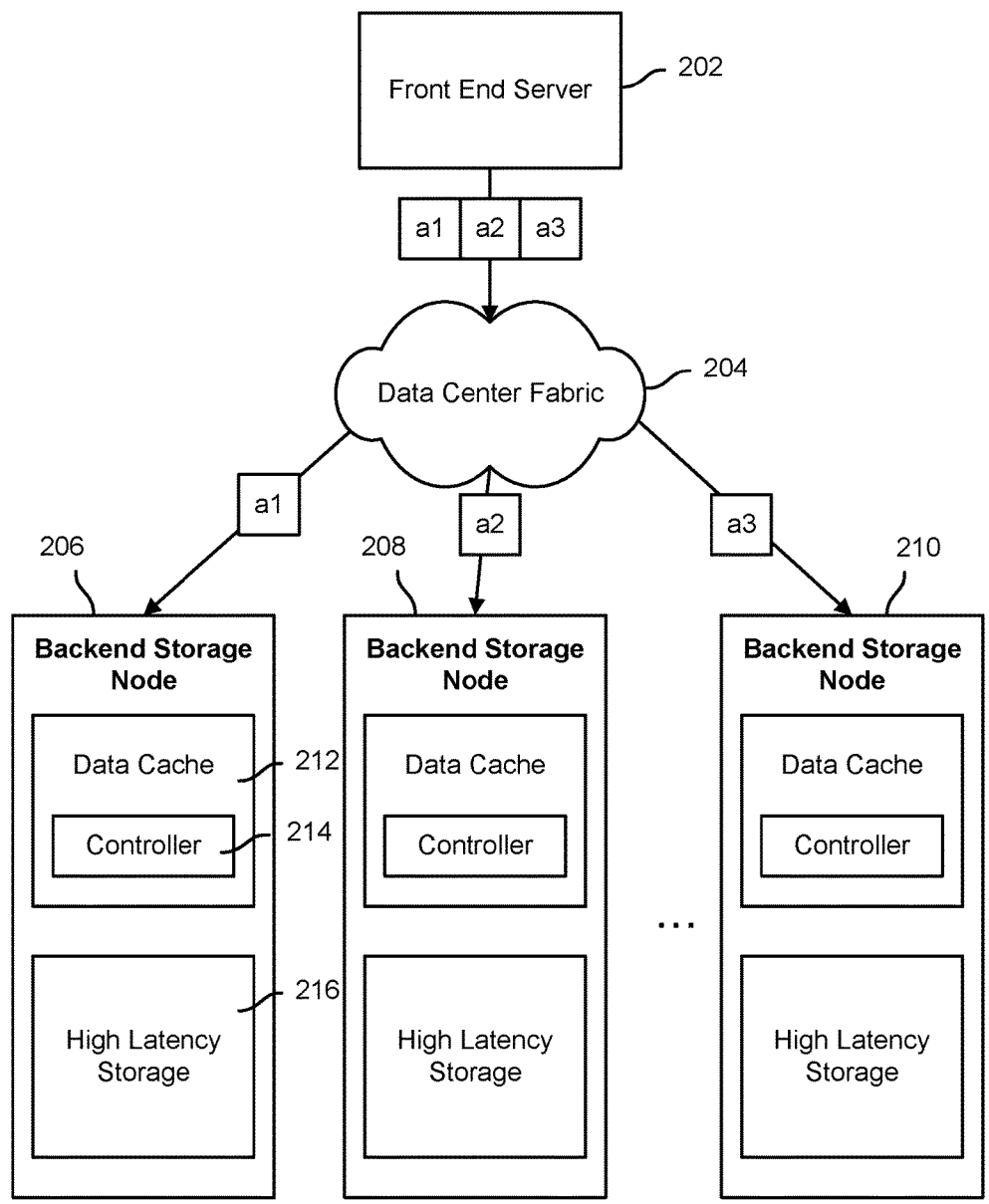
FIG. 2 is a diagram showing an example of a distributed storage cluster in accordance with some embodiments described herein.

FIG. 2 is a diagram showing an example of a distributed storage cluster in accordance with some embodiments described herein. Backend storage nodes 206, 208, and 210 are a subset of backend storage nodes that belong in a cluster of backend storage nodes that redundantly store at least some of the data that is received from front end server 202 over data center fabric 204. For example, data center fabric 204 comprises one or more layers of switches and copper cables/fibers. Front end server 202 is configured to (e.g., simultaneously or in parallel) send at least portions of data blocks (which are sometimes referred to as "data chunks") over data center fabric 204. Front end server 202 is configured to send a different data chunk to each of backend storage nodes 206, 208, and 210 and any other backend storage nodes that are part of the same cluster but not shown in the diagram. For example, data chunks a1, a2, and a3 are divided from data block A. Data chunk a1 is sent by front end server 202 to backend storage node 206, data chunk a2 is sent by front end server 202 to backend storage node 208, and data chunk a3 is sent by front end server 202 to backend storage node 210. For example, data chunks may be divided from data blocks of various files and are included in a data stream to be processed by front end server 202. In some embodiments, front end server 202 may distribute data chunks from a data stream to the backend storage nodes (e.g., backend storage nodes 206, 208, and 210) of the cluster using any appropriate distribution technique. In various embodiments, each data chunk comprises metadata that describes the file with which it is associated and, optionally, an owner of the file.

Backend storage nodes 206, 208, and 210 each include at least some of the same components, including a data cache, a data cache controller, and a high latency storage. For purposes of illustration, only the storage of data chunk a1 by backend storage node 206 will be described even though a similar storage technique may be used by backend storage nodes 208 and 210 and other backend storage nodes of the cluster.

In some embodiments, after front end server 202 sends a data chunk to backend storage node 206, if front end server 202 does not receive a first acknowledgment indicating that backend storage node 206 had successfully received the data chunk (e.g., after a predetermined length of time), then front end server 202 will resend the data chunk to backend storage server 206. Because only data chunks (which are only portions of data blocks) are resent, when appropriate, the latency to receive acknowledgement from backend storage node 206 at front end server 202 is reduced as well as the network bandwidth that is consumed by the transmission of only data chunks (as opposed to data blocks). For example, one data block now is sent as M data chunks (e.g., in parallel) to M backend storage nodes and so each backend storage node receives 1/M of the data block. Therefore, consuming the same fabric quality, the latency to get the receipt of one data block acknowledged at front end server 202 will reduce to 1/M on average, and the transmitted data amount will reduce to 1/M since only one copy instead of M copies is transferred across data center fabric 204.

In various embodiments, after backend storage node 206 successfully receives data chunk a1 from front end server 202, prior to storing received data chunk a1, controller 214 of data cache 212 (e.g., NAND SSD) is configured to encode data chunk a1 using a selected erasure code to generate codeword[a1]. In some embodiments, controller 214 is configured to perform erasure encoding and decoding on received data chunks (e.g., controller 214 is configured to include erasure encoding and decoding logic). In some embodiments, no additional firmware is needed by controller 214 to perform erasure encoding and decoding. In various embodiments, an erasure code comprises a forward error correction (FEC) code and one that transforms an input message (e.g., user data bits) into a codeword of a longer length such that the original message can be recovered from a subset of the symbols of the codeword. Example erasure codes include Reed Solomon and the K+1 parity check. In some embodiments, an erasure code may be selected to use to encode a data chunk based on a computer program and/or a user configuration. According to the selected erasure code, controller 214 generates y parity bits with x user data bits (e.g., input bits) from data chunk a1, thereby creating codeword[a1] with a length of x+y bits. So, after erasure code encoding, the amount of data at backend storage node 206 increases to (x+y)/x times of the incoming data. Then, controller 214 is configured to divide codeword[a1] into (n+1) parts. One of the (n+1) parts of codeword[a1] is kept at data cache 212 of backend storage node 206, while the remaining n parts of codeword[a1] are sent to other n backend storage nodes (e.g., 208 and 210). In some embodiments, the value of n is selected such that x+y=n+1. The original data chunk a1 can be recovered from a subset of the erasure code group of (n+1) backend storage nodes on which parts of codeword[a1] are stored based on the erasure code decoding tolerance of the selected erasure code (e.g., the selected erasure code may require at least m' out of m bits of the codeword[a1] to ensure recovery of the encoded data). Because a codeword is generated at the data cache of a backend storage node from a data chunk (a portion of a data block) and only a portion of the codeword is written to the data cache of a backend storage node, the amount of data that is stored at each data cache is greatly reduced from the conventional technique of storing an entire codeword that is generated from an entire data block into the data cache. Furthermore, by migrating the task of erasure code encoding and decoding to the controller of the data cache, an erasure code processor is no longer needed at each backend storage node.

A first advantage of employing controller 214 of data cache 212 to perform erasure code encoding and decoding is that a CPU at backend storage node 206 no longer needs to be configured to perform erasure code encoding and decoding and may be freed up to perform other processing. A second advantage of employing controller 214 of data cache 212 to perform erasure code encoding and decoding is that user data no longer needs to be read out of data cache 212 prior to being encoded or decoded by controller 214, therefore saving the consumption of data transfer resources. A third advantage of employing controller 214 of data cache 212 to perform erasure code encoding and decoding is that controller 214 is more efficient than a CPU at performing erasure code encoding and decoding.

In some embodiments, after n other backend storage nodes have received their respective parts of codeword[a1], backend storage node 206 will receive acknowledgments from the respective other backend storage nodes. Once backend storage node 206 receives acknowledgments from the respective n other backend storage nodes, backend storage node 206 is configured to send a second acknowledgement to front end server 202 to indicate that the portions of codeword[a1] have been successfully received at n other backend storage nodes. After receiving the two acknowledgements from backend storage node 206 that a codeword based on data chunk a1 has been successfully stored at (n+1) backend storage nodes, front end server 202 may store data indicating that data chunk a1 has been committed to backend storage. Since data caches of the backend storage are non-volatile storage, in various embodiments, data consistency can be guaranteed after the data is committed by the data caches. In some embodiments, backend storage node 206 also sends metadata to front end server 202, where the metadata describes which backend storage nodes store (e.g., which) parts of codeword[a1] so that front end server 202 can use such metadata to request a recovery of codeword[a1] from such backend storage nodes.

In the distributed storage system, there are multiple of groups of M storage nodes working in parallel. Globally, each backend storage node's data cache receives (x+y)/x copies of data to be stored. The backend storage nodes carry out generation of codewords and transmission of codeword portions to other backend storage nodes in parallel. For example, a front end server sends to a data cache of a backend storage node one copy of a data chunk, while $((x+y)/x) \cdot (n/(n+1))$ amount of data is transferred among data caches of backend storage nodes. Considering the fact that x+y=n+1, the $((x+y)/x) \cdot (n/(n+1))$ can be rewritten as $(x+y-1)/x$.

As more parts of various codewords are received at backend storage node 206, a group of codeword parts (the group may include a mix of parts of codewords that were generated locally at backend storage node 206 and parts of codewords that were generated at and received from other backend storage nodes) is flushed (e.g., copied/written) to high latency storage 216 (e.g., an HDD) of backend storage node 206 with the internal storage fabric such as Peripheral Component Interconnect Express (PCIe)/Serial AT Attachment (SATA) translation through host bus adapter (HBA) cards (e.g., HBA cards may translate between input/output protocols such as PCIe and SAS) and does not consume the network resource. In some embodiments, the content in high latency storage 216 is the same as (e.g., at least some of the times) the content in data cache 212, which performs a closely cooperated cache-drive subsystem. Since data cache 212 is non-volatile storage, in various embodiments, data consistency can be guaranteed after the data is committed by data cache 212.

Figure 3:
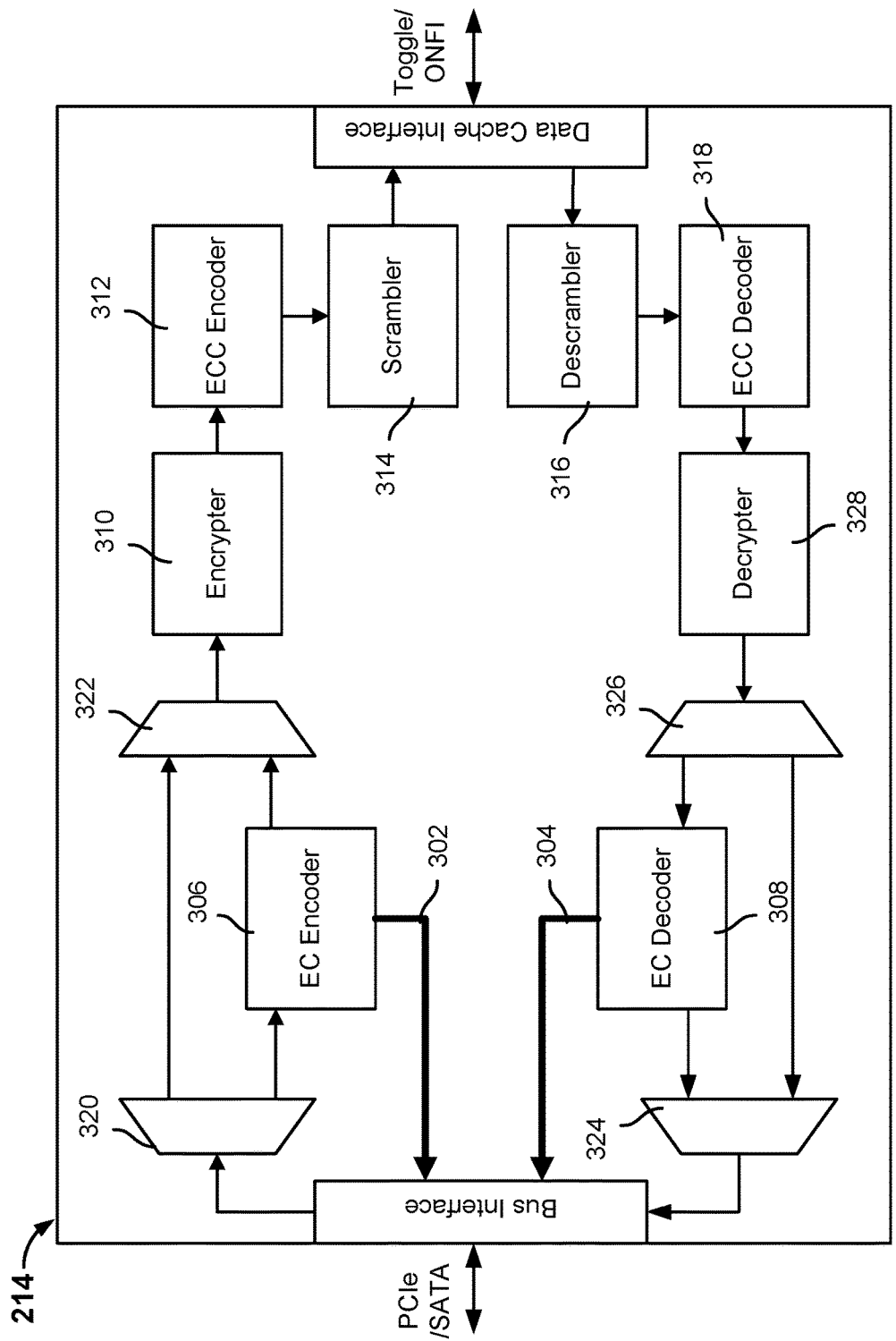
FIG. 3 is a diagram showing an example of a data cache controller of a backend storage node in accordance with some embodiments.

FIG. 3 is a diagram showing an example of a data cache controller of a backend storage node in accordance with some embodiments. In some embodiments, controller 214 of data cache 212 of backend storage node 206 of FIG. 2 may be implemented using the example data cache controller of FIG. 3. In some embodiments, upon receiving a data chunk from a front end server, controller 214 is configured to send an indication to the backend storage node at which the data cache associated with the controller is located and the backend storage node is configured to send a first acknowledgement of receipt of the data chunk to the front end server. In various embodiments, the data cache is configured to perform both encoding of a received data chunk, which is received at the backend storage node which the data cache is part of, into a codeword and also decoding of at least a subset of the codeword back into the data chunk. After the data cache controller receives a data chunk from a front end server via a high-speed serial computer expansion bus interface such as a PCIe or SATA interface, the data chunk is input into demultiplexer 320 and is selected to either be forwarded to erasure code (EC) encoder 306 or to multiplexer 322. Encoder 306 is configured to generate an EC codeword using the data chunk and a selected erasure code. A codeword that is generated by EC encoder 306 is then cut by EC encoder 306 into multiple (e.g., n+1, where n is configurable) portions. One portion of the codeword is passed to multiplexer 322 and forwarded to be encrypted at encrypter 310. For example, encrypter 310 is configured to perform encryption techniques including Advanced Encryption Standard (AES) or RSA on the received codeword portion. The encrypted portion of the codeword is passed to ECC encoder 312 to be checked for errors. The ECC encoded portion of the codeword is then passed to scrambler 314 and scrambled (e.g., made unintelligible for a recipient without a corresponding descrambling device) before it is sent out of the data cache interface and sent over a toggle/Open NAND Flash Interface (ONFI) to be stored at the local data cache. Those portions of the codeword (other than the one portion that is stored at the local data cache) are sent over path 302 to the data cache controllers of other backend storage nodes from the bus interface over PCIe/SATA. In some embodiments, the backend storage node at which the data cache associated with the controller is located is configured to receive acknowledgements from the n other backend storage nodes that they have received their respective portions of the codeword. In some embodiments, the backend storage node at which the data cache associated with the controller is located is then configured to send a second acknowledgement to the front end server that the n other backend storage nodes have received their respective portions of the codeword.

In the event that a data chunk is read during a read operation (e.g., of a file of which the data chunk is a part), EC decoder 308 is configured to receive at most n pieces of the codeword that was generated based on that data chunk over PCIe/SATA via the bus interface from up to n other (e.g., available) backend storage nodes (which are identified to store pieces of the codeword based on metadata that is stored by a front end server) and also, if available, one piece of the codeword that is read from the local data cache (after the one piece of the codeword was received from the data cache, descrambled by descrambler 316, ECC decoded by ECC decoder 318, and decrypted by decrypter 328). The decrypted pieces of the codeword are input into demultiplexer 326 and are selected to either be forwarded to EC decoder 308 or multiplexer 324. In some embodiments, up to n+1 portions of a codeword are received at controller 214 and concatenated together. EC decoder 308 can then decode the concatenated at most n+1 pieces of codewords. Depending on the tolerance of the selected erasure code that was used to encode the codeword, fewer than n+1 pieces of the codeword can be used to recover the data chunk. The decoded data chunk is then sent over path 304 to the bus interface to be returned to the backend storage node at which the data cache at which the controller is associated is located. The backend storage node may send the recovered data chunk to the front end server.

Figure 4:
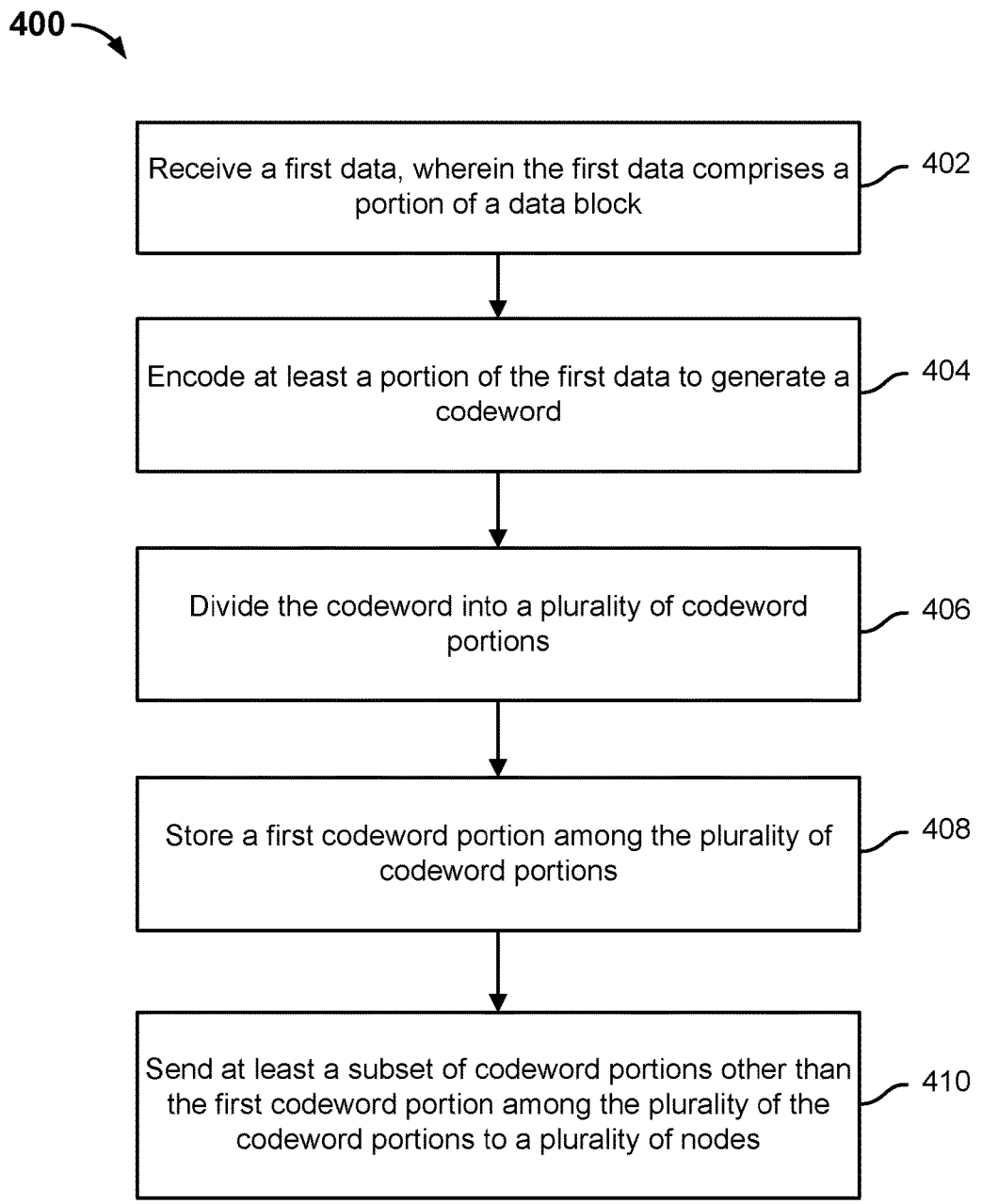
FIG. 4 is a flow diagram showing an example of storing data at a backend storage node in accordance with some embodiments.

FIG. 4 is a flow diagram showing an example of storing data at a backend storage node in accordance with some embodiments. In some embodiments, process 400 is implemented at controller 214 of data cache 212 of backend storage node 206 of FIG. 2.

At 402, a first data is received, wherein the first data comprises a portion of a data block. In various embodiments, a portion of a data block (a data chunk) is received at the backend storage node from a front end server. The data block from which the data chunk is derived is a portion of a file.

At 404, at least a portion of the first data is encoded to generate a codeword. In various embodiments, at least some bits of the data chunk are used to generate a codeword based on a selected erasure code. For example, x number of bits from the data chunk are used to generate y parity bits, thereby generating a codeword that is of (x+y) bits. In some embodiments, the parity bits are interleaved in the subset of the data chunk in the codeword. In some embodiments, the parity bits are appended to the end of the subset of the data chunk in the codeword.

At 406, the codeword is divided into a plurality of codeword portions. In some embodiments, the codeword is cut into several evenly sized portions. For example, the codeword is cut into (n+1) parts and the value of n may be selected such that x+y=n+1.

At 408, a first codeword portion among the plurality of codeword portions is stored. In some embodiments, the first code portion is stored at a local low latency storage. In some embodiments, the local low latency storage is a data cache. For example, the data cache comprises SSD storage. As such, in some embodiments, one of the (n+1) parts of the codeword is stored at the SSD or other low latency storage of the local data cache.

At 410, at least a subset of codeword portions other than the first codeword portion among the plurality of codeword portions is sent to a plurality of nodes. The remaining parts of the codeword are sent to n other backend storage nodes.

In some embodiments, the n other backend storage nodes are selected to be part of an EC group as the backend storage node at which process 400 is performed. In some embodiments, the n other backend storage nodes are randomly selected. In some embodiments, the n other backend storage nodes are selected based on any appropriate technique. In various embodiments, metadata that indicates which n+1 backend storage nodes store portions of the codeword is stored at the front end server. In some embodiments, as the backend storage node stores pieces of codewords (e.g., that are either generated by the data cache controller of that backend storage node or by data cache controllers of other backend storage nodes), groups of pieces of various codewords (e.g., that meet flushing criteria) are stored at a local high latency storage at the backend storage node.

Figure 5:
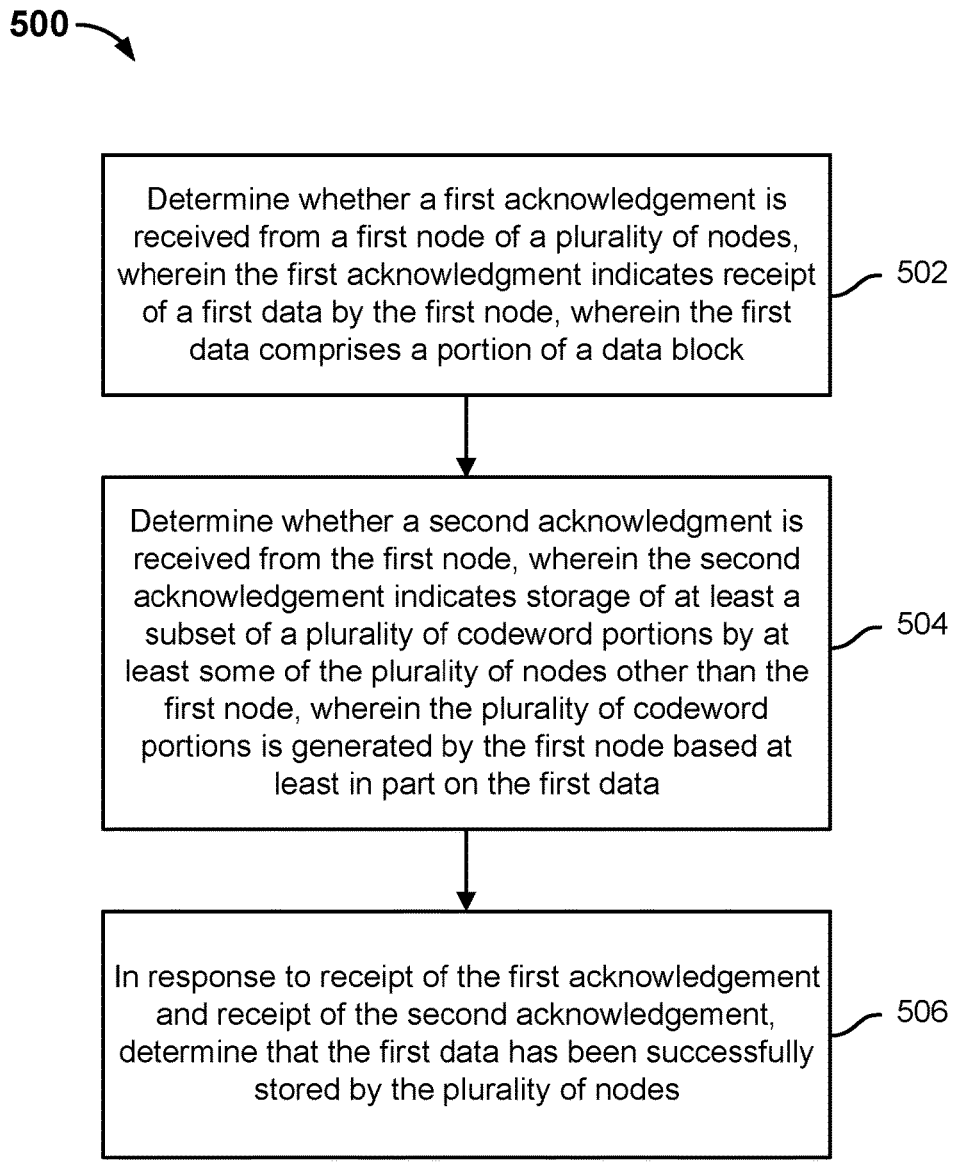
FIG. 5 is a flow diagram showing an example of receiving a two-level commitment at a front end server in accordance with some embodiments.

FIG. 5 is a flow diagram showing an example of receiving a two-level commitment at a front end server in accordance with some embodiments. In some embodiments, process 500 is implemented at front end server 202 of FIG. 2.

Process 500 describes a two-level acknowledgment at the front end server with respect to a cluster of backend storage nodes storing a data chunk that is sent to one of the nodes. The two-level acknowledgment guarantees the data reliability and consistency of data stored at the cluster of backend storage nodes. As will be described in further detail below, a data chunk that fails to be received by a certain backend storage node can be resent to that storage node, thereby minimizing the consumption of network resources by pinpointing the data that is to be resent.

At 502, it is determined whether a first acknowledgment is received from a first node of a plurality of nodes, wherein the first acknowledgment indicates receipt of a first data by the first node, wherein the first data comprises a portion of a data block. After the front end server had sent a data chunk to a first backend storage node of a cluster of backend storage nodes, if the data chunk is successfully received at the first backend storage node, the first backend storage node is configured to send a first acknowledgment back to the front end server indicating the first backend storage node's successful receipt of the data chunk.

After the first backend storage node receives the data chunk, the first backend storage node generates a codeword with the data chunk using a selected erasure code (e.g., Reed-Solomon, K+1 parity check). The codeword is divided into several (e.g., evenly sized) portions. One of the codeword portions is stored at the data cache of the first backend storage node, while the remaining codeword portions are sent to and stored at one or more other backend storage nodes of the cluster.

In some embodiments, after each backend storage node to which a portion of the codeword is sent receives the portion of codeword, that backend storage node stores the portion of the codeword and then sends an acknowledgment back to the first backend storage node. If the first backend storage node does not receive an acknowledgement from another backend storage node (e.g., within a predetermined length of time), the first backend storage node is configured to resend the portion of the codeword that was previously sent to that backend storage node.

At 504, it is determined whether a second acknowledgement is received from the first node, wherein the second acknowledgment indicates storage of at least a subset of a plurality of codeword portions by at least some of the plurality of nodes other than the first node, wherein the plurality of codeword portions is generated by the first node based at least in part on the first data. In the event that all of the backend storage nodes to which the first backend storage node had sent portions of the codeword had successfully received and stored their respective portions and sent acknowledgements back to the first backend storage node, then the first backend storage node is configured to send a second acknowledgment back to the front end server to indicate that the codeword based on the previously sent data chunk has now been collectively stored across multiple backend storage nodes.

At 506, in response to receipt of the first acknowledgment and receipt of the second acknowledgment, it is determined that the first data has been successfully stored by the plurality of nodes. Once the front end server receives both the first acknowledgment and the second acknowledgment from the first backend storage node, the front end server may determine (and store data accordingly to indicate) that the data chunk that it had previously sent to the first backend storage node has been successfully stored across multiple backend storage nodes.

Figure 6:
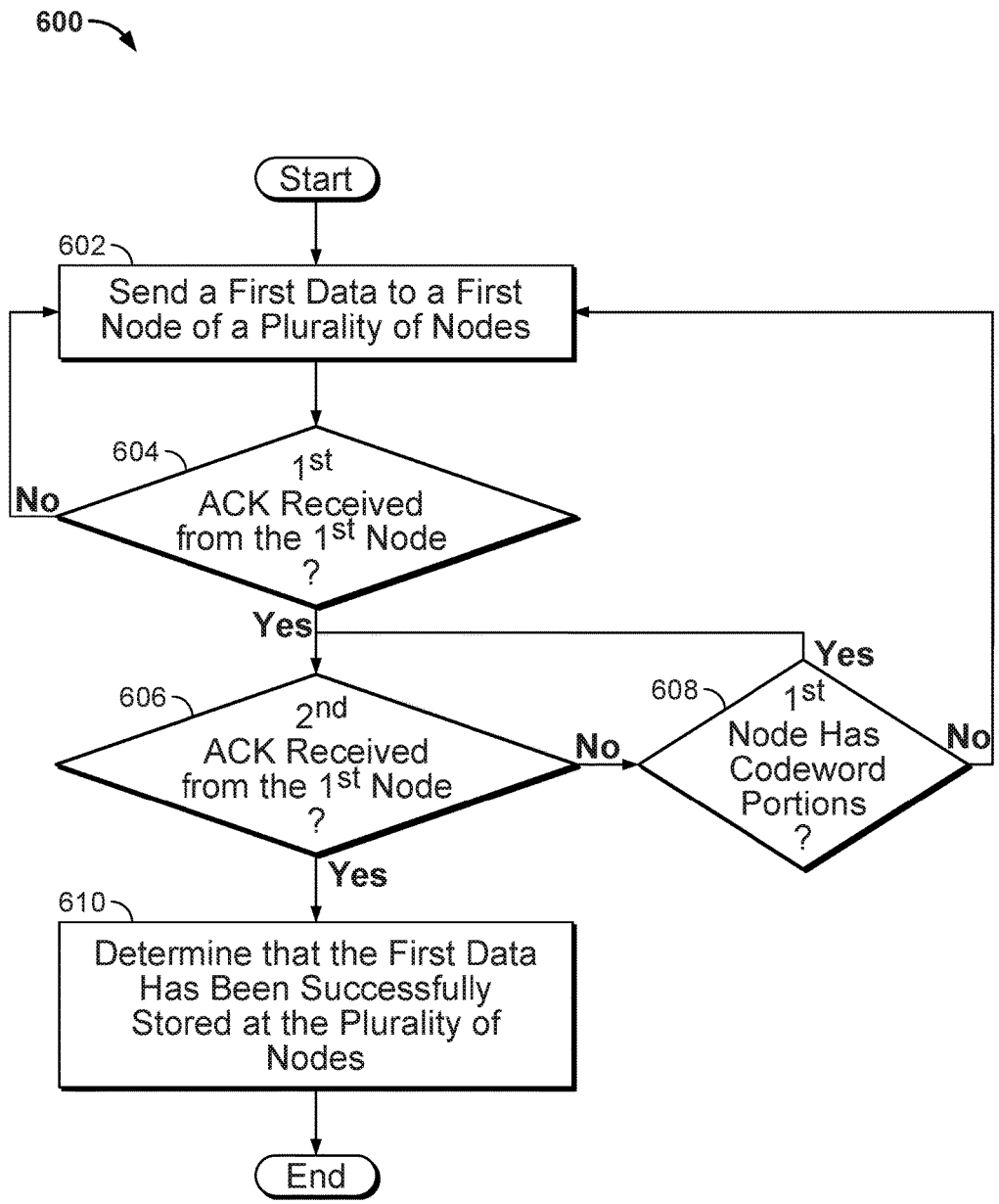
FIG. 6 is a flow diagram showing an example of receiving a two-level commitment at a front end server in accordance with some embodiments.

FIG. 6 is a flow diagram showing an example of receiving a two-level commitment at a front end server in accordance with some embodiments. In some embodiments, process 600 is implemented at front end server 202 of FIG. 2. In some embodiments, process 500 of FIG. 5 may be implemented using process 600.

Process 600 is a process that helps avoid a single point of failure before a codeword is stored at the data cache of multiple backend storage nodes.

At 602, a first data is sent to a first node of a plurality of nodes. In various embodiments, a first data comprises a data chunk is sent to a first backend storage node of a cluster of backend storage nodes.

At 604, it is determined whether a first acknowledgment is received from the first node. In the event the first acknowledgment has been received, control is transferred to 606. Otherwise, in the event that the first acknowledgment has not been received, control is returned to 602. In various embodiments, the first acknowledgment indicates that the first backend storage node has successfully stored the data chunk. If this first acknowledgment is not received (e.g., within a predetermined length of time of sending the data chunk to the first backend storage node), then the front end server resends the data chunk to the first backend storage node.

At 606, it is determined whether a second acknowledgment is received from the first node. In the event the second acknowledgment has been received, control is transferred to 610. Otherwise, in the event that the second acknowledgment has not been received, control is transferred to 608. In various embodiments, the second acknowledgment indicates that the other backend storage nodes, to which the first backend storage node has sent portions of a codeword that the first backend storage node had generated using the data chunk and a selected erasure code, have successfully received and stored the respective portions of the codeword.

At 608, it is determined whether the first node has portions of a codeword that is generated based at least in part on the portion of the data block. In the event that the first node has portions of a codeword that is generated based at least in part on the portion of the data block, control is returned to 606. Otherwise, in the event that the first node does not have portions of a codeword that is generated based at least in part on the portion of the data block, control is returned to 602. If the front end server detects that the first backend storage node at least has the portions of the codeword that was generated from the data chunk, then the front end server assumes that the data chunk does not need to be resent to the first backend storage node and continues to wait for the second acknowledgement (e.g., as the first backend storage node may resend the codeword portions to the other backend storage nodes). However, if the front end server detects that the first backend storage node does not have the portions of the codeword that was generated from the data chunk, then the front end server resends the data chunk to the first backend storage node so that the first backend storage node may (re)generate the codeword and send portions of the codeword to the other backend storage nodes. In some embodiments, a server other than the front end server (e.g., a master server with respect to the cluster of backend storage nodes) keeps track of the completion of data transfer (e.g., transfer of codeword pieces) among different backend storage nodes in the cluster.

At 610, it is determined that the first data has been successfully stored by the plurality of nodes. Only after the front end server receives both the first and the second acknowledgements from the first backend storage node does the front end server determine that the data chunk that had been previously sent to the first backend storage node has been successfully stored across the cluster of backend storage nodes (e.g., and therefore does not need to be resent to the first backend storage node).

Figure 7:
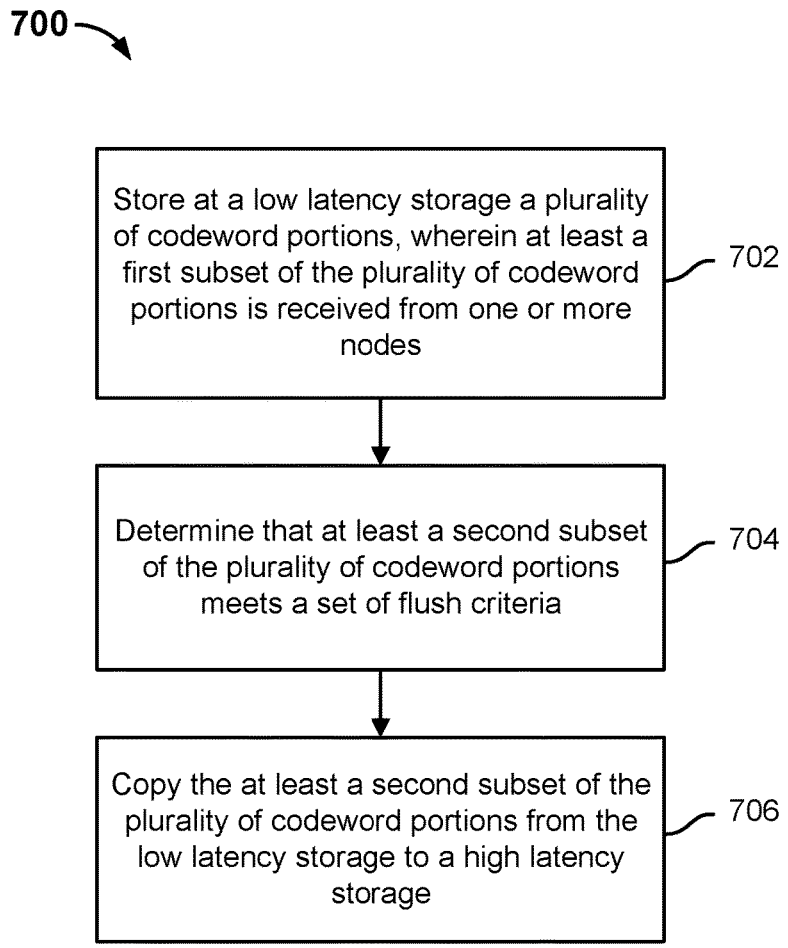
FIG. 7 is a flow diagram showing an example of receiving a two-level commitment at a front end server in accordance with some embodiments.

FIG. 7 is a flow diagram showing an example of receiving a two-level commitment at a front end server in accordance with some embodiments. In some embodiments, process 700 is implemented at controller 214 of data cache 212 of FIG. 2.

At 702, a plurality of codeword portions is stored at a low latency storage, wherein at least a first subset of the plurality of codeword portions is received from one or more nodes. In various embodiments, a low latency storage of a backend storage node comprises its data cache. For example, the data cache comprises SSD or flash storage, which provides faster access than HDD. As described herein, a backend storage node generates codewords from received data chunks, cuts each codeword into multiple parts, and then stores (at least) one part of a codeword at the local data cache and sends the remaining portions of the codeword to other backend storage nodes. Over time, portions of codewords that were generated by the backend storage node and portions of codewords generated and received from other backend storage nodes are stored at that backend storage node.

At 704, it is determined that at least a second subset of the plurality of codeword portions meets a set of flush criteria. A group of codeword portions (that include one or more portions of codewords that were generated at the local backend storage node and one or more portions of codewords that were generated at other backend storage nodes) that meet a set of flush criteria is configured to be copied into a high latency storage at the same backend storage node. For example, the high latency storage comprises HDD. For example, HDD is used as a permanent storage media because it provides large storage capacity at a reasonable cost. In some embodiments, the high latency storage is a larger storage than the low latency storage of the data cache. In various embodiments, the high latency storage provides slower accesses than the low latency storage of the data cache. For example, a flush criteria may be that a group of codeword portions reaches a predetermined total size, the group of codeword portions has been stored at the data cache for at least a predetermined length of time, the used capacity of the data cache has exceeded a predetermined threshold, and/or the data cache is running at a low burden. In some embodiments, the group of codeword portions comprises several megabytes (MB) in size.

At 706, the at least second subset of the plurality of codeword portions is copied from the low latency storage to a high latency storage. In some embodiments, a group of codeword portions that meet a set of flush criteria is configured to be copied into a high latency storage at the same backend storage node. In some embodiments, the group of codeword portions is indicated for reclamation and may be asynchronously reclaimed (e.g., by a background garbage collection process) from the data cache to free up space at the data cache. Writing a group of codeword portions at a time enables sequential writes at the high latency storage (e.g., HDD), which will ensure good performance.

Figure 8:
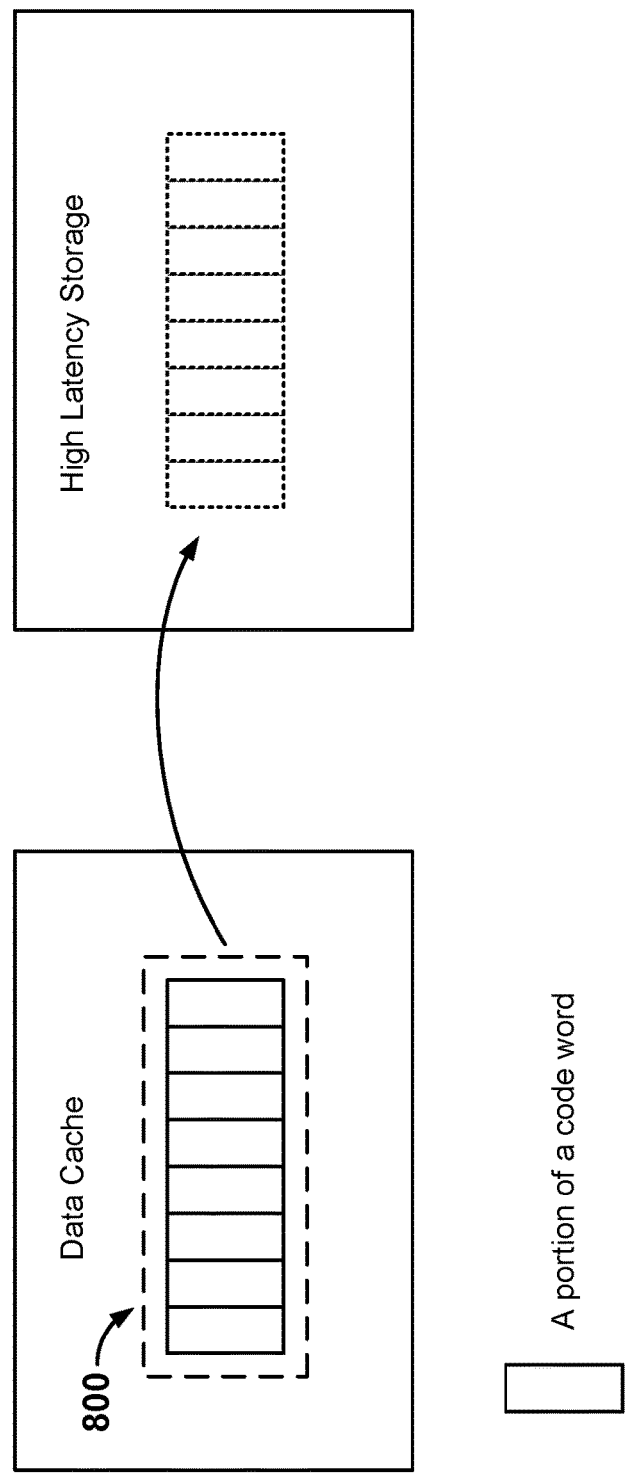
FIG. 8 is a diagram that shows an example of a group of codeword portions that are to be flushed from a data cache into a high latency storage of a backend storage node.

FIG. 8 is a diagram that shows an example of a group of codeword portions that are to be flushed from a data cache into a high latency storage of a backend storage node. In various embodiments, the data cache comprises SSD or another storage medium with a faster access than the HDD of the high latency storage. In the example, group of codeword portions 800 that is stored at the data cache meets a set of flush criteria and is therefore to be copied into the high latency storage. In some embodiments, sometime later, group of codeword portions 800 may be reclaimed from the data cache to free up storage space at the data cache.

Figure 9A:
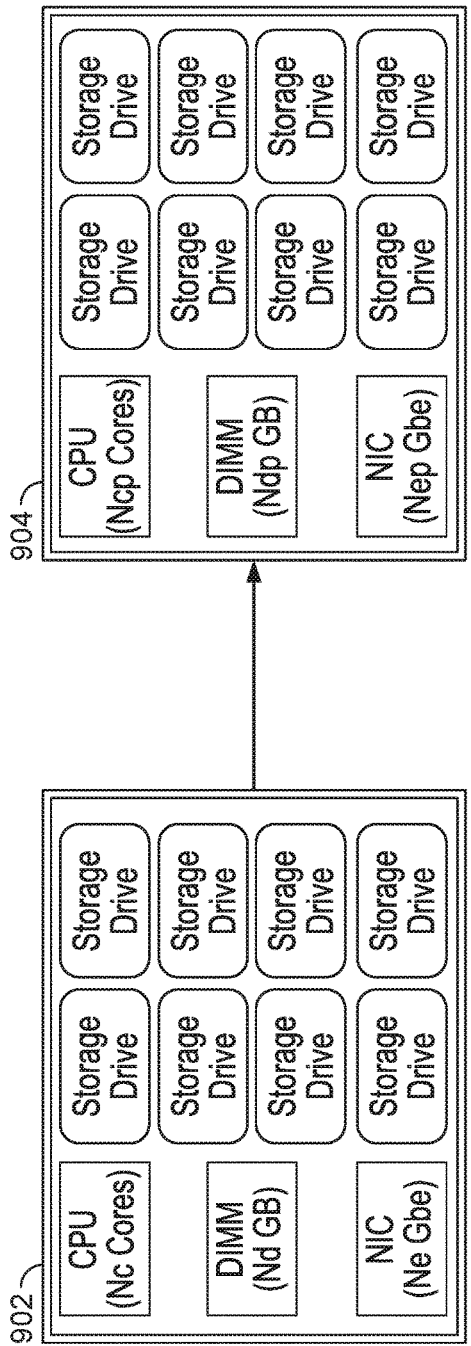
FIG. 9A shows an example of a reduction of storage and processing resources that is needed by a backend storage node in accordance with some embodiments.

FIG. 9A shows an example of a reduction of storage and processing resources that is needed by a backend storage node in accordance with some embodiments. In some embodiments, due to the offloading of erasure encoding and decoding from an erasure code process (e.g., a CPU) to a data cache controller, the reduction of data that is stored at a data cache (e.g., SSD), and the reduction in data that is transmitted over the data center fabric, the requirements on a backend storage node are reduced. For example, the straightforward approach to reduce storage and processing resources from traditional backend storage node configuration 902 is to use a downgraded configuration such as shown in backend storage node 904, where the values of Ncp, Nc, Ndp, Nd, Nep, and Ne are selected such that Ncp<Nc, Ndp<Nd, and Nep<Ne.

Figure 9B:
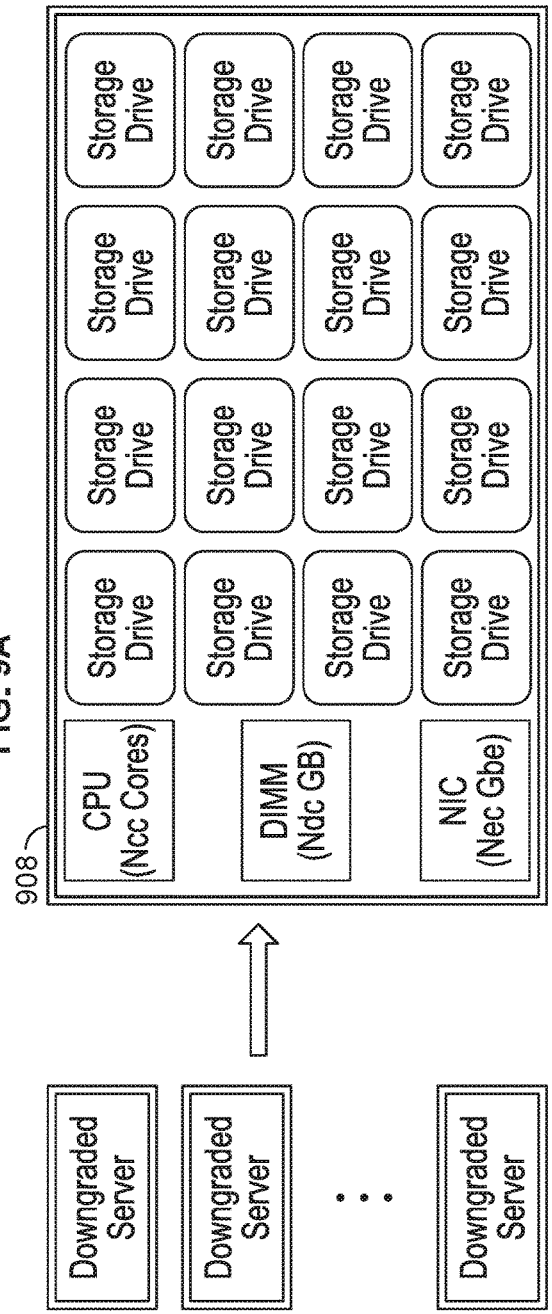
FIG. 9B shows an example of combining several downgraded backend storage nodes into a single converged backend storage node in accordance with some embodiments.

FIG. 9B shows an example of combining several downgraded backend storage nodes into a single converged backend storage node in accordance with some embodiments. On the other hand, it is also feasible to use the similar CPU/MEM/NIC hardware configuration to attach more storage drives to increase the storage capacity of a single backend storage node which is shown as FIG. 9B. This convergence collects the drives from different downgraded backend storage nodes together, and this saves the common components including motherboard, power supply, fan, chassis, adaptors, BMC, etc. Meanwhile, from the operation aspect, fewer nodes are needed to be monitored and maintained, so the operational cost is cut down as well. In some embodiments, converged backend storage node 908 can also be provisioned to provide one or more virtual backend storage nodes.

In various embodiments, data (e.g., data chunks) enters the data cache of a backend storage node as a single copy, becomes encoded as a codeword with erasure coding, the codeword is divided into multiple parts, and the parts of the codeword are spread not only at the backend storage node that had generated the codeword but also spread out to more storage nodes for additional data protection.

In various embodiments, the amount of data written into data caches (e.g., SSD) is reduced because only portions of codewords that are generated based on data chunks are written to data caches, which is less data than the entire data blocks that were conventionally written to data caches. Reducing the amount of data written to SSD-based data caches will extend the lifespan of the data caches.

In various embodiments, the data amount that is transferred from front end servers to the backend servers is reduced (e.g., because now single copies of data chunks are transferred as opposed to the multiple copies of entire data blocks that were traditionally done). The network traffic of the data center fabric is improved, which leads to a shorter latency on average to successfully store one data block from users at a cluster of backend storage nodes.

In various embodiments, to ensure the data consistency, a two level acknowledgement is used to avoid any single point failure before the erasure code protected data is permanently stored (e.g., at data caches).

In various embodiments, offloading erasure coding from an erasure code processor (e.g., a CPU) to the integrated circuits (e.g., ASIC) of a data cache helps the simplification of backend storage node design. For example, the computations formerly belonging to server CPUs (e.g., x86 CPU) can be migrated onto the hardware IC design, which may finish certain types of computation with efficiency. The offloading also helps to weaken the backend storage node's CPU, which will eventually be replaced with low-end processors for cost reduction.

In various embodiments, the data cache of a backend storage node accumulates the parts of different codewords and forms large blocks from them. Therefore, the data flushing from data cache SSD to local HDD ensures the sequential write of HDD which improves the performance of the HDD.

In various embodiments, at least one round of data block write and read on a data cache is reduced, and so this minimizes the wear on SSD. To help the data cache work faster and extend lifespan, the key-value style may be used to append data in a data cache (e.g., SSD) and thus, no in-situ update is made and the data cache can be customized to work straightforward as a barrel buffer or FIFO most of the time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data, comprising:
   receiving, at a first node, a first data from a front end server, wherein the first data comprises a portion of a data block;
   encoding, at the first node, at least a portion of the first data to generate a codeword;
   dividing, at the first node, the codeword into a plurality of codeword portions;
   storing, local to the first node, first subset of the plurality of codeword portions; and
   sending, from the first node, a second subset of the plurality of the codeword portions to a plurality of nodes other than the first node, wherein the first subset of the plurality of codeword portions is different from the second subset of the plurality of codeword portions.

2. The method of claim 1, wherein the first subset of the plurality of codeword portions is stored at a local low latency storage and further comprising:
   determining a group of codeword portions that meet a set of flush criteria, wherein at least a subset of the group of codeword portions is received from the plurality of nodes; and copying the at least subset of the group of codeword portions from the local low latency storage into a local high latency storage.

3. The method of claim 1, wherein the second subset of the plurality of codeword portions is stored at the plurality of nodes.

4. The method of claim 1, wherein the encoding is based at least in part on an erasure code.

5. The method of claim 1, further comprising sending to the front end server a first acknowledgment indicating receipt of the first data.

6. The method of claim 1, further comprising:
sending to the front end server a first acknowledgement indicating receipt of the first data;
receiving a plurality of acknowledgements from the plurality of nodes in response to receiving the second subset of the plurality of codeword portions; and
in response to receipt of the plurality of acknowledgements, sending a second acknowledgment to the front end server indicating that the first data has been successfully stored.

7. The method of claim 1, further comprising:
receiving a second codeword portion from a second node of the plurality of nodes; and
storing the second codeword portion at a local low latency storage.

8. The method of claim 1, wherein metadata indicating which nodes among the plurality of nodes store which codeword portions among the plurality of codeword portions is stored at the front end server.

9. A system for storing data, comprising:
a processor; and
a memory coupled with the processor, wherein the memory is configured to provide the processor with instructions which when executed cause the processor to:
receive, at a first node, a first data from a front end server, wherein the first data comprises a portion of a data block;
encode, at the first node, at least a portion of the first data to generate a codeword;
divide, at the first node, the codeword into a plurality of codeword portions;
store, local to the first node, a first subset of the plurality of codeword portions; and
send, from the first node, a second subset of the plurality of the codeword portions to a plurality of nodes other than the first node, wherein the first subset of the plurality of codeword portions is different from the second subset of the plurality of codeword portions.

10. The system of claim 9, wherein the system further comprises a data cache that includes a local low latency storage.

11. The system of claim 9, wherein the system further comprises a data cache that includes a local low latency storage and wherein the local low latency storage comprises a solid state drive (SSD).

12. The system of claim 9, wherein the system further comprises a local low latency storage and a local high latency storage and wherein the memory is configured to provide the processor with further instructions which when executed cause the processor to:
determine a group of codeword portions that meet a set of flush criteria, wherein at least a subset of the group of codeword portions is received from the plurality of nodes; and
copy the at least subset of the group of codeword portions from the local low latency storage into the local high latency storage.

13. The system of claim 9, wherein the system further comprises a local low latency storage and a local high latency storage comprising a hard disk drive (HDD) and wherein the memory is configured to provide the processor with further instructions which when executed cause the processor to:
determine a group of codeword portions that meet a set of flush criteria, wherein at least a subset of the group of codeword portions is received from the plurality of nodes; and
copy the at least subset of the group of codeword portions from the local low latency storage into the local high latency storage.

14. The system of claim 9, wherein the memory is configured to provide the processor with further instructions which when executed cause the processor to send to the front end server a first acknowledgment indicating receipt of the first data.

15. The system of claim 9, wherein the memory is configured to provide the processor with further instructions which when executed cause the processor to:
send to the front end server a first acknowledgement indicating receipt of the first data;
receive a plurality of acknowledgements from the plurality of nodes in response to receiving the second subset of the plurality of codeword portions; and
in response to receipt of the plurality of acknowledgements, send a second acknowledgment to the front end server indicating that the first data has been successfully stored.

16. A system for storing data, comprising:
a network fabric configured to connect a front end server and a first backend node; and
the front end server configured to:
determine whether a first acknowledgement from the first backend node is received over the network fabric, wherein the first acknowledgment indicates receipt of a first data by the first backend node, wherein the first data comprises a portion of a data block;
determine whether a second acknowledgement from the first backend node is received, wherein the second acknowledgement indicates storage of at least a second subset of a plurality of codeword portions at a plurality of backend nodes other than the first backend node, wherein the plurality of codeword portions is generated by the first backend node based at least in part on the first data, wherein a first subset of the plurality of codeword portions is stored at the first backend node, wherein the first subset of the plurality of codeword portions is different from the second subset of the plurality of codeword portions; and
in response to receipt of the first acknowledgement and receipt of the second acknowledgment, determine that the first data has been stored; and
the first backend node configured to:
receive the first data;
encode at least a portion of the first data to generate a codeword;
divide the codeword into the plurality of codeword portions;
store, local to the first backend node, the first subset of the plurality of codeword portions; and send the second subset of the plurality of codeword portions to the plurality of backend nodes other than the first backend node.

* * * * *

UNITED STATES PATENT AND TRADEMARK OFFICE
CERTIFICATE OF CORRECTION

PATENT NO. : 10,268,538 B2
APPLICATION NO. : 15/362555
DATED : April 23, 2019
INVENTOR(S) : Shu Li It is certified that error appears in the above-identified patent and that said Letters Patent is hereby corrected as shown below:

In the Claims

In Column 12, Claim 1, Line 54, before "first subset", insert --a--.

Signed and Sealed this
Twelfth Day of November, 2019

Andrei Iancu
*Director of the United States Patent and Trademark Office*